United States Patent [19]

Hansen et al.

[11] Patent Number: 4,642,221

[45] Date of Patent: Feb. 10, 1987

[54] METHOD AND COMPOSITION FOR INHIBITING CORROSION IN AQUEOUS HEAT TRANSFER SYSTEMS

[75] Inventors: Gerald D. Hansen, Holicong; Joseph N. Biber, West Chester, both of Pa.

[73] Assignee: Atlantic Richfield Company, Los Angeles, Calif.

[21] Appl. No.: 510,502

[22] Filed: Jul. 5, 1983

[51] Int. Cl.$^4$ ............................................. C23F 11/04
[52] U.S. Cl. .................................... 422/16; 252/392; 252/180
[58] Field of Search .................. 252/392, 180; 422/16

[56] References Cited

U.S. PATENT DOCUMENTS

| | | | |
|---|---|---|---|
| Re. 30,796 | 11/1981 | Lesinski | 252/180 X |
| 1,810,946 | 6/1931 | Calcott et al. | 252/392 X |
| 2,368,604 | 1/1945 | White | 252/392 X |
| 2,888,405 | 5/1959 | Fields et al. | 252/392 |
| 2,999,732 | 9/1961 | Kahler et al. | 422/16 |
| 3,116,105 | 12/1963 | Kerst | 422/16 |
| 3,699,052 | 10/1972 | Petrey, Jr. et al. | 422/16 X |
| 3,720,616 | 3/1973 | Randell et al. | 252/392 X |
| 3,806,459 | 4/1974 | Petrey, Jr. | 252/180 X |
| 3,895,170 | 7/1975 | Tanaka et al. | 252/392 X |
| 3,903,005 | 9/1975 | Kablaoui et al. | 252/392 X |
| 3,962,109 | 6/1976 | Oberhofer et al. | 252/180 X |
| 4,022,712 | 5/1977 | Noack | 252/392 X |
| 4,450,088 | 5/1984 | Wilson et al. | 252/392 X |
| 4,486,339 | 12/1984 | Young | 252/180 X |

FOREIGN PATENT DOCUMENTS 139843  10/1979  Japan ............................ 422/16

*Primary Examiner*—John F. Terapane
*Assistant Examiner*—Matthew A. Thexton
*Attorney, Agent, or Firm*—Coleman R. Reap

[57] ABSTRACT

Corrosion of metal surfaces in cooper or copper alloy cooling water systems is inhibited by the addition of small amounts of aromatic triazoles and iminodicarboxylic acids or derivatives thereof to the cooling water system.

9 Claims, No Drawings

METHOD AND COMPOSITION FOR INHIBITING CORROSION IN AQUEOUS HEAT TRANSFER SYSTEMS

BACKGROUND OF THE INVENTION

This invention relates to the inhibition of corrosion of metal surfaces and more particularly to the inhibition of corrosion of copper or copper alloy surfaces in heat transfer equipment.

Metal surfaces which are in continuous contact with water or aqueous liquids, particularly aqueous liquids that contain chemicals or mineral salts, generally undergo considerable corrosion. To extend the life of the metal surfaces it is common practice to add small amounts of certain chemical substances to the aqueous liquid to inhibit corrosion of the metal surfaces.

Copper metal and copper alloys, which are often used in heat transfer equipment because of their superior heat transfer properties, are particularly susceptible to corrosion. One class of organic compounds, the aromatic triazoles, have been found to be quite effective in inhibiting the corrosion of copper metal. The triazole molecule appears to form a complex with the copper on the surfaces of the metal thereby forming a coating on the metal surfaces which protects the surfaces from the effects of corrosive materials. Several patents and literature references describe the use of aromatic triazoles alone or in combination with other chemical compounds as corrosion inhibitors. U.S. Pat. No. 3,265,620, issued to Heiman, discloses metal working coolants containing diethanolamine, benzotriazole and the tetrasodium salt of ethylene diaminetetraacetic acid. U.S. Pat. No. 3,291,741, issued to Maciejewski et al, discloses an anticorrosive composition comprised of, inter alia, benzotriazole and 4,4-bis(3-nitro-4 hydroxyphenyl)pentanoic acid. U.S. Pat. No. 4,197,210, issued to Bridger, discloses a lubricant composition comprised of an oil-soluble adduct of benzotriazole and a dialkylamine. U.S. Pat. No. 3,553,137, issued to Woods, discloses a three component corrosion inhibitor for methoxypropanol comprised of an alkali metal nitrite, a piperazine and benzotriazole. Polish Pat. Nos. 90115 (see Chemical Abstract 90:74229m) and 95752 (see Chemical Abstract 91:23747s) disclose mining apparatus hydraulic fluids containing benzotriazole and an emulsifying oil containing diethanolamine. Razrab. Mer Zashch. Met. Korroz., Mezhdunar. Nauchno-Tekk. Konf. Probl. SEV. 3rd, 1980, 3, 47–50 (see Chemical Abstract 95:136895q) discloses a volatile corrosion inhibitor comprised of hydroxybenzotriazole and diethanolamine. Japanese Pat. No. 57049677 and Japanese Pat. No. 8249677 disclose methylbenzotriazole amine and diethanolamine benzotriazole salts as corrosion inhibitors for aqueous inks. Japanese Pat. No. 8223071 discloses a cooling system corrosion inhibitor comprised of benzotriazole and diethanolamine. Japanese patent application 8017864 discloses a corrosion inhibitor for wire enamels comprised of the diethanolamine salt of benzotriazole. British Pat. No. 2,080,342 discloses a composition for improving rust resistance comprised of an aliphatic dicarboxylic acid and 1-hydroxybenzotriazole.

Quite often there is a tendency for bacteria to accumulate and multiply in cooling water systems. To counteract the growth of bacteria, water soluble hypochlorites, such as sodium hypochlorite and other chlorine-containing compounds which form hypochlorite ions, are added to the cooling water. Although these compounds are effective biocides, they interfere with the aromatic triazole, apparently by combining with the triazole. Another problem encountered in the use of aromatic triazoles in cooling water systems is that the cooling water often contains small amounts of copper ions. These copper ions also combine with the aromatic triazoles thereby reducing the amount of aromatic triazole that is available for the protection of the metal surface.

Because of the effectiveness of aromatic triazoles in inhibiting corrosion of metal surfaces it would be desirable to eliminate the interference of chlorine-containing compounds with the corrosion inhibiting effectiveness of aromatic triazoles. It would be very beneficial if the interference of both chlorine-containing compounds and copper ions with the effectiveness of the triazoles could be eliminated at the same time.

SUMMARY OF THE INVENTION

Corrosion inhibiting compositions which contain aromatic triazoles and which are substantially free from interference by hypochlorite and copper ions have now been discovered. Accordingly, it is an object of the invention to present improved aromatic triazole-based corrosion inhibitors. It is another object of the invention to present aromatic triazoles containing corrosion inhibiting compositions which are substantially free from interference by hypochlorite ions. It is another object of the invention to present aromatic triazole-containing corrosion inhibitors which are substantially free from interference by copper ions. It is another object of the invention to present an improved method of inhibiting corrosion of copper metal or copper alloy cooling water systems. It is another objective to present a method of substantially eliminating the interference of hypochlorite ions and copper ions with the corrosion-inhibiting activity of aromatic triazole-containing corrosion inhibiting compositions. These and other objects of the invention are supported in the following description and examples.

The above objects are achieved in the new compositions of this invention, which comprise one or more aromatic triazoles and one or more imines of a carboxylic acid, a carboxylic acid ester, a water-soluble salt of a carboxylic acid or mixtures of any of these. In a preferred embodiment the aromatic triazole is benzotriazole or an alkylbenzotriazole and the imine compound is an imine dicarboxylic acid.

DETAILED DESCRIPTION OF THE INVENTION

The aromatic triazoles useful in the invention are any of the aromatic triazoles which have corrosion inhibiting activity. These include benzenetriazole and derivatives of benzotriazoles, such as alkyl-substituted triazoles, hydroxy-substituted benzotriazoles, halogen-substituted benzotriazoles, etc. The alkylbenzotriazoles which are commonly used as corrosion inhibitors are those having 1 to 8 alkyl carbon atoms. Although alkylbenzotriazoles having more than about 8 alkyl carbon atoms and higher aromatic triazoles, such as naphthotriazole, can be used in the invention, these compounds are less desirable because of their higher cost or because they are not readily commercially available. Preferred alkylbenzotriazoles are those having 1 to 6 alkyl carbon atoms. Other substituted benzotriazole compounds include hydroxybenzotriazoles. Examples of suitable aromatic triazoles are benzotriazole, methylbenzotriazole, dimethylbenzotriazole, ethylbenzotriazole, diethylbenzotriazole, hydroxybenzotriazole, methylhydroxybenzotriazole, etc.

The imino compounds useful in the invention have the structural formula

NHRR' wherein R and R' are identical or different carboxylic acid radicals, carboxylic acid ester radicals, alkali or alkaline earth metal salts of carboxylic acid radicals or mixtures of these. Carboxylic acid radicals suitable for use in the invention are the saturated or ethylenically unsaturated aliphatic mono- or polycarboxylic acid radicals and aromatic mono- or polycarboxylic acid radicals. The water-soluble lower molecular weight carboxylic acid radicals are preferred for applications in aqueous systems, while the oil-soluble higher molecular weight carboxylic acid radicals are useful in systems comprised substantially of petroleum-based liquids. Carboxylic acid radicals generally found useful are those having 2 to 10 or more carbon atoms. Although carboxylic acid radicals having more than about 10 carbon atoms can be used in the invention they are generally less desirable than the lower molecular weight carboxylic acid radicals. Typical saturated aliphatic acid radicals include the radicals of acetic acid, propionic acid, butyric acid, pentanoic acid, 3 methylhexanoic acid, succinic acid, malonic acid, etc. Typical unsaturated aliphatic acid radicals include the radicals of acrylic acid, allylic acid, maleic acid, fumaric acid, etc. The aromatic acid radicals which can be conveniently used in the invention include the unsubstituted or alkyl-substituted radicals of benzoic acid, the phthalic acids, etc. Typical alkyl-substituted aromatic acid radicals include the radicals of methylbenzoic acid, dimethylbenzoic acid, methylphthalic acid, etc. Preferred carboxylic acid radicals are the saturated aliphatic carboxylic acid radicals having 2 to 6 carbon atoms, including acetic acid, propionic acid and butyric acid radicals.

Suitable carboxylic acid ester radicals include the alkyl ester or partial ester radicals of any of the above acids. Typical ester radicals are those having 1 to 6 alkyl alcohol moiety carbon atoms and 2 to 10 acid moiety carbon atoms, i.e., 3 to 16 total carbon atoms. Typical ester radicals include methyl acetate, ethyl acetate, hexyl propionate, butyl succinate dimethyl malonate, ethylmethyl adipate, dimethyl maleate, methyl benzoate, etc., radicals. Preferred ester radicals are the alkyl ester radicals of saturated aliphatic carboxylic acids having 1 to 4 alcohol moiety carbon atoms and 2 to 6 acid moiety carbon atoms, i.e. 3 to 10 total carbon atoms. Preferred alkyl ester radicals include methyl acetate, methyl propionate, ethyl butyrate, butyl pentanoate, etc. radicals.

Suitable water soluble alkali or alkaline earth metal carboxylic acid salts include the salts of any of the above-identified acid radicals. The alkali and alkaline earth metals which generally form water-soluble salts of carboxylic acids include sodium, potassium, lithium, beryllium, magnesium, calcium, etc. Typical carboxylic acid salt radicals include sodium acetate, potassium propionate, magnesium acetate, sodium succinate, potassium benzoate, etc. radicals. Carboxylic acid radicals of mixed salts and partial salts are also contemplated. Preferred cations are sodium, potassium and magnesium. Preferred carboxylic acid salt radicals include the salts of saturated aliphatic carboxylic acid radicals having 2 to 6 carbon atoms, such as sodium acetate, potassium acetate, magnesium acetate, sodium propionate, potassium butyrate, sodium pentanoate, etc. radicals.

Some aromatic triazole and imino compounds are commercially available. Others can be manufactured by any of the known methods for making these compounds. The preparation of the aromatic triazoles and imino compounds useable in this invention forms no part of the invention.

The compositions of the invention can be prepared by blending the components. The method of preparation of the compositions of the invention is not critical. A convenient method of preparation is to dissolve or disperse the components in water to produce an aqueous concentrate containing about 10 to 30% active components.

The amount of corrosion inhibitor composition used in an application will depend upon the characteristics of the operating systems and the quality of the water used in the system. In general, the amounts used will be a matter of choice. Very small amounts are effective in inhibiting corrosion. The upper limit is determined by economics and practical considerations. In general, a sufficient amount of corrosion inhibitor is usually used to provide aromatic triazole and imino compound concentrations of about 0.01 to 250 ppm each and more. Commonly the concentration of each of these components is maintained in the range of about 0.1 to 50 ppm, based on the total weight of aqueous medium in the system. The ratio of aromatic triazole to imino compound in the compositions of the invention is not critical and can be tailored to meet specific requirements. Popular ratios are in the range of about 95 to 50 parts of aromatic triazole to 50 to 5 parts of imino compound. More commonly, ratios are in the range of about 90 to 70 parts by weight of aromatic triazole to 30 to 10 parts of imino compound.

The corrosion inhibitor can be introduced into the system in any desired manner and at any desired location. It is often preferred to introduce the corrosion inhibitor at points just upstream of the equipment to be protected. A proportionating pump or other injection means can be used to introduce the corrosion inhibitor into the system.

Other additives may be added to the corrosion inhibiting compositions of the invention, if desired. For example, other corrosion inhibitors, dispersants, buffering agents, antifoulants, etc. may be incorporated into the corrosion inhibiting compositions.

The invention is exemplified by the following specific working examples. Unless otherwise indicated, parts and percentages are on a weight basis.

The examples were carried out according to the following procedure. The corrosion experiments were run in a cell comprised of a 600 ml tallform beaker into which was inserted a copper coupon ½ inch wide by 3 inches long by 1/16 inch thick. The copper coupon was Series 110 electrolytic copper. 400 ml of solution was added to the beaker. The solution was a water mixture of the treatment chemicals and sodium hypochlorite. The water used was a filtered tap water having the analysis listed in TABLE I. The copper ion was added as cupric chloride. The solution in the beaker was stirred with a magnetic stirrer except during the actual measurement of corrosion. Prior to use the copper coupons were immersed in an inhibited HCl solution , water washed, burnished with a Nylon ® pad, rinsed with acetone and air dried. Chlorine was added to the test solutions as sodium hypochlorite. The concentration of available chlorine was determined by an Orion Specific chlorine electrode using an Orion pH meter Model 900.

The experimental design was a matrix in which the pH of the solution and the concentration of inhibitor were independent variables as shown in TABLE II. The corrosion in terms of mils/year (mpy) is tabulated in the boxes of TABLE II. The coupons were immersed in the test solutions for twenty-four hours at 37° C. Corrison rates were determined using a Princeton Applied Research Model 350-A Corrosion Measuring System. The Stern-Geary method was used to determine the corrosion rate.

EXAMPLE I (Comparative)

Various corrosion experiments were carried out in accordance with the above procedure. In the experiments, methylbenzotriazole was added to the test solutions at concentrations varying from 0 to 5 ppm. The corrosion rates were determined at pH's ranging from 6.0 to 8.0. Each system contained 0.5 ppm of copper II ion and an available chlorine content of 5 ppm (calculated as $Cl_2$). The results are tabulated in TABLE II.

EXAMPLE II

The procedure of Example I was repeated except that iminodiacetic acid was added to the test solutions in amounts to provide a constant methylbenzotriazole to iminodiacetic acid ratio of 4:1. The results are tabulated in TABLE II.

TABLE I

| Water Analysis | |
|---|---|
| Calcium$^{++}$ (CaCO$_3$) | 106 ppm |
| Cupric (Cu$^{++}$) ion[1] | 5 ppm |
| Iron (as soluble iron) | 0.08 ppm |
| Phosphate ion | 0.45 ppm |
| Sulfate ion | 110 ppm |
| Chloride ion | 39 ppm |
| Total Hardness (CaCO$_3$) | 160 ppm |

[1]The Cu$^{++}$ ion was added to the test solution as cupric chloride.

TABLE II

| Inhibitor Concentration, ppm | | Corrosion Rate, mpy | | | | | |
|---|---|---|---|---|---|---|---|
| pH | Run | 0 | 1 | 2 | 3 | 4 | 5 |
| 6.0 | 1 | .366 | .377 | .262 | .172 | .189 | .138 |
|  | 2 |  | .225 | .164 | .179 | .134 | .127 |
| 6.5 | 1 | .213 | .525 | .399 | .295 | .217 | .079 |
|  | 2 |  | .737 | .085 | .297 | .111 | .057 |
| 7.0 | 1 | .568 | .273 | .317 | .232 | .239 | .143 |
|  | 2 |  | .084 | .016 | .232 | .213 | .045 |
| 7.5 | 1 | .249 | .939 | .228 | .201 | .280 | 1.39 |
|  | 2 |  | .236 | .084 | .155 | .048 | .103 |
| 8.0 | 1 | .359 | 1.509 | 3.4 | .26 | .445 | .39 |
|  | 2 |  | .627 | .490 | .209 | .207 | .104 |

Table II shows the results obtained using methylbenzotriazole at various concentrations. In the number 1 runs the methylbenzotriazole was used alone, and in the number 2 runs the methylbenzotriazole was used in combination with iminodiacetic acid at a methylbenzotriazole to imminodiacetic acid weight ratio of 4:1. Comparisons of the number 1 and number 2 runs at each pH and inhibitor concentration level shows that the corrosion rate is, in almost all cases, significantly lower when the iminodiacetic acid is used in combination with the methylbenzotriazole.

Although the invention is illustrated with particular reference to specific examples, it is understood that the invention is not limited thereto. Variations are included within the scope of the invention. For example, the corrosion inhibitors may be used in combination with the imino acids described herein, and the corrosion inhibiting compositions of the invention may be used in other systems. The scope of the invention is limited only by the breadth of the appended claims.

What is claimed is:

1. In a method of inhibiting corrosion of copper or copper alloy metallic surfaces which are in contact with an aqueous liquid containing hypochlorite ions by adding to the aqueous liquid an aromatic triazole, the improvement comprising adding to the aqueous liquid an imino compound having the structural formula

NHRR' where R and R' are identical or different radicals selected from saturated aliphatic carboxylic acid radicals having 2 to 6 carbon atoms, saturated aliphatic carboxylic acid ester radicals having 2 to 6 acid moiety carbon atoms and 3 to 16 total carbon atoms, and water soluble alkali or alkaline earth metal salts of saturated aliphatic carboxylic acid radicals having 2 to 6 carbon atoms and mixtures of these.

2. The improved method of claim 1 wherein the total amount of imino compound in the aqueous medium is maintained in the range of about 0.01 to 250 ppm, based on the total weight of the aqueous medium present.

3. The improved method of claim 1 wherein R and R' are saturated aliphatic carboxylic acid radicals having 2 to 6 carbon atoms.

4. The improved method of claim 1 wherein the total amount of imino compound present in the aqueous medium is maintained in the range of about 0.1 to 50 ppm.

5. The improved method of any of claims 1, 2, 3 or 4 wherein said aromatic triazole is selected from benzotriazole, hydroxybenzotriazole, alkyl-substituted benzotriazoles having 1 to 6 alkyl carbon atoms and mixtures of these.

6. The improved process of claim 5 wherein the total amount of aromatic triazole in the aqueous medium is maintained in the range of about 0.01 to 250 ppm, based on the total weight of a aqueous medium present.

7. The improved process of claim 6 wherein said aromatic triazole is selected from benzotriazole, methylbenzotriazoles, dimethyltriazoles, hydroxybenzotriazole and mixtures of these and said imino compound is iminodiacetic acid.

8. A method of inhibiting corrosion of copper or copper alloy metal surfaces in cooling water systems comprising maintaining in the cooling water about 0.01 to 250 ppm of an aromatic triazole selected from benzotriazole, hydroxybenzotriazole, methylbenzotriazoles, dimethyltriazoles and mixtures of these and about 0.01 to 250 ppm of an iminodicarboxylic acid selected from iminodiacetic acid, iminodipropionic acid, iminodibutyric acid, iminodipentanoic acid, iminodihexanoic acid, and mixtures of these.

9. The method of claim 8 wherein said aromatic triazole is benzotriazole, methylbenzotriazole or mixtures of these and it is maintained in the cooling water at a concentration of about 0.1 to 50 ppm and said iminodicarboxylic acid is iminodiacetic acid and it is maintained in the cooling water at a concentration of 0.1 to 50 ppm.

* * * * *